US006593001B1

(12) United States Patent
Watanabe

(10) Patent No.: US 6,593,001 B1

(45) **Date of Patent: *Jul. 15, 2003**

(54) METHOD FOR PERFORATING HEAT-SENSITIVE STENCIL SHEET AND STENCIL SHEET

(75) Inventor: Hideo Watanabe, Inashiki-gun (JP)

(73) Assignee: Riso Kagaku Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 17 days.

(21) Appl. No.: 08/725,503

(22) Filed: Oct. 4, 1996

(30) Foreign Application Priority Data

Oct. 5, 1995 (JP) ............................................ 7/284610

(51) Int. Cl.7 ................................................ B32B 15/12

(52) U.S. Cl. ...................................................... 428/464

(58) Field of Search ................................ 427/557, 143, 427/209, 372.2, 385.5, 404, 411, 430.1; 428/464; 252/600; 106/20 R

(56) References Cited

U.S. PATENT DOCUMENTS

| | | | | | |
|---|---|---|---|---|---|
| 3,151,548 | A | * | 10/1964 | Picking | 427/143 |
| 3,871,899 | A | * | 3/1975 | Andersen | 117/35.5 |
| 3,938,163 | A | * | 2/1976 | Fujimoto et al. | |
| 4,268,615 | A | * | 5/1981 | Yonezawa | 427/557 X |
| 4,961,377 | A | * | 10/1990 | Bando et al. | 427/143 X |
| 4,981,746 | A | * | 1/1991 | Matsuo et al. | 428/195 |
| 5,073,698 | A | * | 12/1991 | Stultz | 427/557 X |
| 5,198,407 | A | * | 3/1993 | Motegi et al. | 503/226 |
| 5,221,561 | A | * | 6/1993 | Flicstein et al. | 427/557 X |
| 5,456,969 | A | * | 10/1995 | Suzuki et al. | |
| 5,483,883 | A | * | 1/1996 | Hayama | |
| 5,506,086 | A | * | 4/1996 | Van Zoeren | |
| 6,203,149 | B1 | * | 3/2001 | Watanabe et al. | 347/86 |
| 6,394,571 | B1 | * | 5/2002 | Yano et al. | 347/17 |

FOREIGN PATENT DOCUMENTS

| | | | |
|---|---|---|---|
| EP | 0 635 362 A1 | | 1/1995 |
| GB | 1 431 462 | | 4/1976 |
| JP | 51-7588 | * | 3/1976 |
| JP | 51-7589 | * | 3/1976 |
| JP | 62111742 | * | 5/1987 |
| JP | 4-353497 | * | 12/1992 |

* cited by examiner

*Primary Examiner*—Bernard Pianalto

(74) *Attorney, Agent, or Firm*—Fitch, Even, Tabin & Flannery

(57) ABSTRACT

A method for perforating heat-sensitive stencil sheet is provided, which comprises ejecting a photothermal conversion material contained in a liquid from a liquid-ejecting means to transfer it together with the liquid to heat-sensitive stencil sheet, and then exposing the heat-sensitive stencil sheet to a visible or infrared ray to perforate the heat-sensitive stencil sheet specifically at portions to which the photothermal conversion material has been transferred. The stencil sheet may have a liquid absorbing layer and a layer reflecting the visible or infrared ray. Upon perforation, stencil sheet is not required to contact any substance such as an original or a thermal head.

10 Claims, 1 Drawing Sheet

METHOD FOR PERFORATING HEAT-SENSITIVE STENCIL SHEET AND STENCIL SHEET

The present invention relates to a method for perforating heat-sensitive stencil sheet, and more specifically relates to a method of perforating heat-sensitive stencil sheet by exposing it to a visible or infrared ray to make a master for stencil or screen printing, and heat-sensitive stencil sheet and a composition used in the method.

As structures of conventional heat-sensitive stencil sheet, are known a multilayer which is composed of a thermoplastic film laminated to an ink-permeable porous substrate made of Japanese paper or the like, and one layer which is composed simply of a thermoplastic film.

Methods for perforating such heat-sensitive stencil sheet to obtain a master for stencil or screen printing, include (1) a process of overlaying heat-sensitive stencil sheet on images or letters that have been formed with carbon-containing materials such as pencils and toner by hand-writing or photocopying, and then exposing them to light from flash lamps, infrared lamps or the like to cause the portions of letters or images to emit heat so that the thermoplastic film of the stencil sheet is molten and perforated at the portions contacting the images or letters, and (2) a process of melting and perforating the thermoplastic film of the stencil sheet by bringing the stencil sheet into contact with a thermal head that emits heat in dot-matrix forms so as to reproduce images in accordance with image data of electric signals into which original images or letters have been transformed.

In the above process (1), however, failure in perforation often occurs due to insufficient contact of the thermoplastic film of the stencil sheet with the original or the photocopied image portions of toner from which heat is emitted, or a problem on so-called "pin holes" also occurs which are phenomena of perforations caused in the stencil sheet at undesired portions by heat emitted from dusts on the surface of the original or toner scattered out of the image portions. In the above process (2), there often occur failure of perforation, failure of conveying and wrinkling of the stencil sheet due to unevenness of pressure exerted to press the stencil sheet to the thermal head.

It is an object of the present invention to provide a method of perforating heat-sensitive stencil sheet, which overcomes the above mentioned problems on prior art, and eliminates failure in perforation, occurance of pin-holes and wrinkling, and failure in conveying. It is another object of the present invention to provide heat-sensitive stencil sheet and a composition useful in the above method of perforating heat-sensitive stencil sheet.

According to the above objects, the present invention provides a method of perforating heat-sensitive stencil sheet particularly to make a master for screen or stencil printing, which comprises ejecting a photothermal conversion material contained in a liquid from a liquid-ejecting means to transfer it together with the liquid to heat-sensitive stencil sheet, and then exposing the heat-sensitive stencil sheet to a visible or infrared ray to perforate the heat-sensitive stencil sheet specifically at portions to which the photothermal conversion material has been transferred.

In other words, the present method is a method for making a master for screen or stencil printing, which comprises a first step of transferring a photothermal conversion material to heat-sensitive stencil sheet by ejecting a liquid which contains the photothermal conversion material, from a liquid-ejecting means to the heat-sensitive stencil sheet, and the second step of perforating the heat sensitive stencil sheet specifically at sites to which the photothermal conversion material has been transferred, by subjecting the stencil sheet to a visible or infrared ray.

The first step of the present method can be practiced, for example, by controlling a liquid-ejecting means to eject the liquid onto heat-sensitive stencil sheet while the liquid-ejecting means is moved relative to the heat-sensitive stencil sheet in accordance with image data that have previously been transformed into electric signals, and then evaporating the liquid that has been transferred to the heat sensitive stencil sheet, so that the image is reproduced on the surface of the heat sensitive stencil sheet as solid adherends mainly composed of the photothermal conversion material.

The liquid-ejecting means may be a device which comprises nozzles, slits, a porous material, or a porous film providing 10–2000 openings per inch (i.e., 10 to 2000 dpi) and connected to piezoelectric elements, heating elements, liquid-conveying pumps or the like so as to eject the liquid containing the photothermal conversion material intermittently or continuously, that is, in a form of dots or lines, in accordance with the electric signals for letters or images.

The photothermal conversion material used in the present invention is a material which can transform light energy into heat energy, and preferably is a material which efficient in photothermal conversion, such as carbon black, lampblack, silicon carbide, carbon nitride, metal powders, metal oxides, inorganic pigments, organic pigments, and organic dyes. Among them, particularly preferred are those having a high light-absorbency within a specific range of wavelength, such as phthalocyanine colorings, cyanine colorings, squalirium colorings, and polymethine colorings.

The liquid in which the photothermal conversion material is contained, may be solvents such as of aliphatic hydrocarbons, aromatic hydrocarbons, alcohols, ketones, esters, ethers, aldehydes, carboxylic acids, amines, low molecular weight heterocyclic compounds, oxides, and water. More specific examples thereof are hexane, heptane, octane, benzene, toluene, xylene, methyl alcohol, ethyl alcohol, isopropyl alcohol, n-propyl alcohol, butyl alcohol, ethylene glycol, diethylene glycol, propylene glycol, glycerin, acetone, methyl ethyl ketone, ethyl acetate, propyl acetate, ethyl ether, tetrahydrofuran, 1,4-dioxane, formic acid, acetic acid, propionic acid, formaldehyde, acetaldehyde, methylamine, ethylene diamine, dimethylformamide, pyridine, and ethylene oxide. These liquids may be used alone or in combination, and are preferably those which evaporate quickly after having been transferred from the liquid-ejecting means to the heat-sensitive stencil sheet. To the liquid, may be added dyes, pigments, fillers, binders, hardening agents, preservatives, wetting agents, surfactants, pH-adjusting agents, or the like, as required.

Thus, a composition for perforating heat-sensitive stencil sheet can be prepared by appropriately dispersing or mixing the above photothermal conversion material in or with the above liquid in a form readily ejectable from the liquid-ejecting means.

In the second step of the present method, when a visible or infrared ray is applied to the heat-sensitive stencil sheet to which a photothermal conversion material has been transferred, the photothermal conversion material absorbs light to emit heat. As a result, the thermoplastic film of the heat-sensitive stencil sheet is molten and perforated to obtain a master for screen or stencil printing directly from the stencil sheet itself. In this way, the present perforating method does not require stencil sheet to contact any substance such as an original or thermal head to make a master, but only requires stencil sheet itself to be exposed to a visible or infrared ray. Thus, no wrinkling occurs on stencil sheet upon making masters. The visible or infrared ray can readily be radiated using xenon lamps, flash lamps, halogen lamps, infrared heaters or the like.

The heat-sensitive stencil sheet may be stencil sheet to at least one side of which the photothermal conversion material can be transferred and which can be molten and perforated by heat emitted by the photothermal conversion material. The stencil sheet may be made of a thermoplastic film only, or may be a thermoplastic film laminated to a porous substrate.

The thermoplastic film includes a film made from polyethylene, polypropylene, polyvinyl chloride, polyvinylidene chloride, polyethylene terephthalate, polybutylene terephthalate, polystyrene, polyurethane, polycarbonate, polyvinyl acetate, acrylic resins, silicone resins, and other resinous compounds. These resinous compounds may be used alone, in combination, or as a copolymer. Suitable thickness of the thermoplastic film is 0.5–50 $\mu$m, preferably 1–20 $\mu$m. If the film is less than 0.5 $\mu$m in thickness, it is inferior in workability and strength. If the film is greater in thickness than 50 $\mu$m, it is not economical to be perforated requiring a great amount of heat energy.

The above porous substrate may be a thin paper, a nonwoven fabric, a gauze or the like, which is made from natural fibers such as Manila hemp, pulp, Edgeworthia, paper mulberry and Japanese paper, synthetic fibers such as of polyester, nylon, vinylon and acetate, metallic fibers, or glass fibers, alone or in combination. Basis weight of these porous substrates is preferably 1–20 g/m$^2$, more preferably 5–15 g/m$^2$. If it is less than 1 g/m$^2$, stencil sheet is weak in strength. If it is more than 20 g/m$^2$, stencil sheet is often inferior in ink permeability upon printing. Thickness of the porous substrate is preferably 5–100 $\mu$m, more preferably 10–50 $\mu$m. If the thickness is lower than 5 $\mu$m, stencil sheet is weak in strength.

If it is greater than 100 $\mu$m, stencil sheet is often inferior in ink permeability upon printing.

The heat-sensitive stencil sheet used in the present invention preferably has a liquid absorbing layer laminated to a side of the stencil sheet to which the liquid is ejected, in order to prevent the liquid from blurring on the stencil sheet or to accelerate drying of the liquid on the stencil sheet. In this case, perforations faithful to the original image are obtained when stencil sheet is exposed to light, and thus sharp image can be printed.

The liquid absorbing layer is preferably formed on the outermost surface of the stencil sheet as a resinous layer which is molten and perforated similarly to the thermoplastic film when the stencil sheet is exposed to light to obtain a master. The liquid absorbing layer can be made of any material so long as it can prevent the liquid from blurring in the planar direction and fix the photothermal conversion material on stencil sheet. Preferably, the liquid absorbing layer is made of a material high in affinity with the above liquid used. For example, if the liquid is aqueous, the liquid absorbing layer can be made of polymer compounds such as polyvinyl alcohol, methyl cellulose, carboxymethyl cellulose, hydroxyethyl cellulose, polyvinyl pyrrolidone, ethylene-vinyl alcohol copolymers, polyethylene oxide, polyvinyl ether, polyvinyl acetal, and polyacrylamide. These resinous compounds may be used alone, in combination or as a copolymer. If the liquid is an organic solvent, the liquid absorbing layer can be made of polymer compounds such as polyethylene, polypropylene, polyisobutylene, polystyrene, polyvinyl chloride, polyvinylidene chloride, polyvinyl fluoride, polyvinyl acetate, acrylic resins, polyamide, polyimide, polyester, polycarbonate, and polyurethane. These resinous compounds may be used alone, in combination, or as a copolymer.

Further, organic or inorganic particulates may be added to the liquid absorbing layer. Such particulates include organic particulates such as of polyurethane, polyester, polyethylene, polystyrene, polysiloxane, phenol resin, acrylic resin, and benzoguanamine resin, and inorganic particulates such as of talc, clay, calcium carbonate, titanium oxide, aluminum oxide, and kaolin.

The liquid absorbing layer can be obtained by applying a liquid containing the above polymer compound and if necessary the above particulate, to stencil sheet by use of a coating means such as a gravure coater and a wire bar coater, and then drying it.

The heat-sensitive stencil sheet used in the present invention preferably has a light reflecting layer which reflects the visible or infrared ray, in order to prevent light energy from being converted to heat at portions of stencil sheet to which no photothermal conversion material is transferred. In this case, only image portions where the photothermal conversion material is transferred are perforated, while non-image portions are not perforated. Thus, perforated heat-sensitive stencil sheet can be obtained without “pin-holes”.

The light reflecting layer can be formed as a metal film by vacuum deposition of a metal on the above thermoplastic film, or can be formed by applying a liquid containing a metal powder and a polymer compound of the above thermoplastic film onto the thermoplastic film of the stencil sheet by use of a coating means such as a gravure coater and a wire bar coater, and then drying it. The metal is preferably one that is high in light reflectivity such as gold, aluminum and tin.

When the light reflecting layer is a metal film vacuum-deposited on stencil sheet, the thermoplastic film of the stencil sheet is molten upon exposure to light, causing the metal film to lose its supporting structure and to be detached therefrom at portions where the photothermal conversion material has been transferred, so that perforations are made in the stencil sheet. When the light reflecting layer is made from the mixture of metal powders and polymer compounds, the thermoplastic film of the stencil sheet and the light reflecting layer are simultaneously molten upon exposure to light, at portions where the photothermal conversion material has been transferred, so that perforations are made in the stencil sheet.

When the light reflecting layer and the liquid absorbing layer are both laminated to the present stencil sheet, the liquid absorbing layer may be laminated onto the light reflecting layer, or the light reflecting layer may be laminated onto one side of the thermoplastic film of the stencil sheet while the liquid absorbing layer is laminated onto the other side of the thermoplastic film.

Stencil sheet which has been perforated in accordance with the present invention can serve for printing with ordinary stencil printing apparatuses. For example, printed matter is obtained by placing printing ink on one side of the perforated stencil sheet, putting printing paper on the other side, and then passing the ink through the perforated portions of the stencil sheet by means of pressing, pressure-reducing or squeezing so as to transfer the ink onto the printing paper. Printing ink may be those conventionally used in stencil printing, such as oil ink, aqueous ink, water-in-oil (W/O) emulsion ink, oil-in-water (O/W) emulsion ink, and heat-meltable ink.

Hereinafter, the present invention will be explained in more detail by way of a presently-preferred example with reference to the accompanying drawings in which:

Figure 1A:
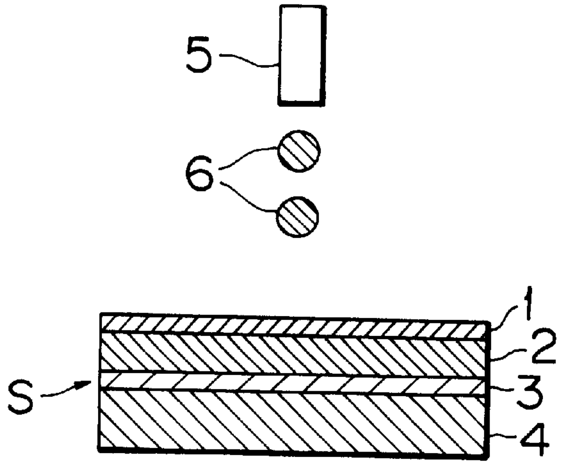
FIG. 1A is a sectional side view which diagrammatically shows a state in which a liquid containing a photothermal conversion material is ejected from a liquid ejecting means to a liquid absorbing layer of heat-sensitive stencil sheet.

It should be construed that the following example is presented for only illustrative purpose, and the present invention is not limited to the example.

EXAMPLE

A light reflecting layer of 300 Å in thickness was formed by vacuum-deposition of aluminum on one side of a polyester film of 3 μm in thickness. Then, a mixed liquid of 10 parts by weight of polyvinyl butyral and 90 parts by weight of isopropyl alcohol was applied to the other side of the polyester film with a wire bar coater and dried to form a liquid absorbing layer of 0.5 μm in thickness. Then, a polyester cloth leaf of 200 mesh was laminated to the light reflecting layer to obtain heat-sensitive stencil sheet S having a four layer structure of a liquid absorbing layer 1, a thermoplastic film 2, a light reflecting layer 3 and a porous substrate 4, as shown in FIG. 1A.

On the other hand, a composition for perforating heat-sensitive stencil sheet was prepared by mixing 10 parts by weight of carbon black, 1 part by weight of butyral resin, and 89 parts by weight of isopropyl alcohol.

Figure 1B:
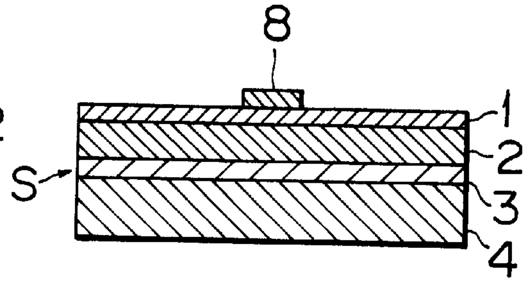
FIG. 1B is a sectional side view which diagrammatically shows a state in which a photothermal conversion material is transferred onto heat-sensitive stencil sheet.

Then, as shown in FIG. 1A, the composition was ejected to the liquid absorbing layer of the heat-sensitive stencil sheet from a liquid ejecting means having 360 dpi nozzles, so that the carbon black was transferred onto the heat-sensitive stencil sheet S as letter images as shown in FIG. 1B.

Figure 1C:
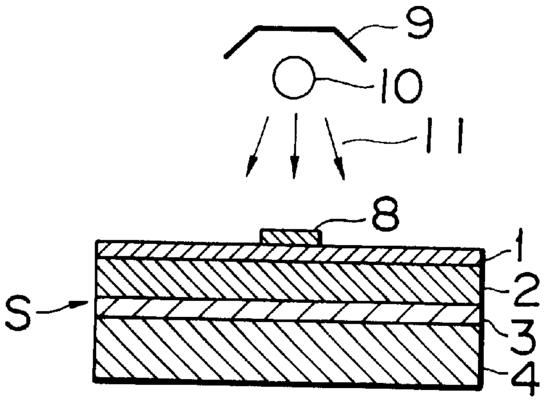
FIG. 1C is a sectional side view which diagrammatically shows a state in which light is radiated to heat-sensitive stencil sheet onto which a photothermal conversion material has been transferred.
Figure 1D:
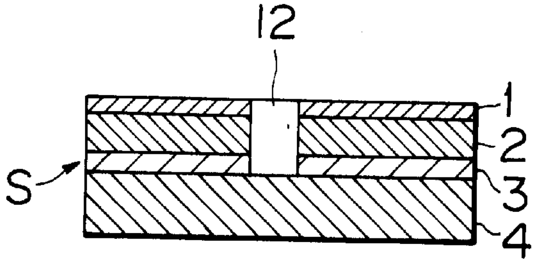
FIG. 1D is a sectional side view which diagrammatically shows a state in which heat-sensitive stencil sheet is perforated after exposed to light.

After isopropyl alcohol was evaporated, light 11 was radiated to letter image portions at which the carbon black 8 had been transferred and fixed on the stencil sheet, by use of a xenon flash 10 accompanied with a light reflector 9, as shown in FIG. 1C. As a result, thanks to heat emitted by the carbon black at the letter image portions, the liquid absorbing layer 1 and the thermoplastic film 2 were molten, and the light absorbing layer 3 was removed to form perforation 12.

Then, stencil printing ink "HiMesh Ink" (trade name) manufactured by RISO KAGAKU CORPORATION was placed on the porous substrate 4 of the above perforated stencil sheet S, and printing was effected with a portable stencil printing machine "PRINT GOCCO" (trade name) manufacture by RISO KAGAKU CORPORATION using the above stencil sheet S. As a result, image which was sharp and faithful to the original was printed, and no pin-hole was observed on portions other than the image.

According to the present invention, a photothermal conversion material is contained in a liquid and ejected to heat-sensitive stencil sheet directly from a liquid ejecting means which is located apart from the stencil sheet, so that the photothermal conversion material contained in the liquid is directly transferred to the stencil sheet. Thus, upon perforation by light radiation, no pin-hole is formed, no problem occurs on failure in perforation resulting from failure in contact of the stencil sheet with an original or a thermal head as in conventional perforating methods, and perforation is effected faithfully to the original image data.

What is claimed is:

1. A method for perforating a heat-sensitive stencil sheet comprised of a thermoplastic film and a liquid absorbing layer coated onto one side of said thermoplastic film, said method comprising ejecting intermittently or continuously in the form of dots or lines a photothermal conversion material contained in a liquid from a liquid-ejecting means to transfer it together with said liquid onto said liquid absorbing layer of said heat-sensitive stencil sheet; and then exposing said heat-sensitive stencil sheet to a visible or infrared ray to perforate completely through said heat-sensitive stencil sheet specifically at portions to which said photothermal conversion material has been transferred, wherein said ejecting is controlled by electric signals to produce a desired image, said liquid absorbing layer is made of a resinous compound that is a polymeric material selected from the group consisting of polyvinyl alcohol, methyl cellulose, carboxymethyl cellulose, hydroxyethyl cellulose, polyvinyl pyrrolidone, ethylene-vinyl alcohol copolymers, polyethylene oxide, polyvinyl ether, polyvinyl acetal, polyacrylamide, and mixtures and copolymers thereof, said polymeric material having a high affinity for the liquid containing said photothermal conversion material, and said liquid is an aqueous liquid.

2. A heat-sensitive stencil sheet which comprises a thermoplastic film, an outermost liquid absorbing layer coated onto one side of said thermoplastic film, and a porous substrate laminated to the other side of said thermoplastic film, said liquid absorbing layer being made of a resinous compound, which resinous compound consists of a polymeric material having a high affinity for a liquid containing a photothermal conversion material deposited on said liquid absorbing layer, wherein said liquid absorbing layer is capable of absorbing an aqueous liquid and is made of a resinous compound selected from the group consisting of polyvinyl alcohol, methyl cellulose, carboxymethyl cellulose, hydroxyethyl cellulose, polyvinyl pyrrolidone, ethylene-vinyl alcohol copolymers, polyethylene oxide, polyvinyl ether, polyvinyl acetal, polyacrylamide, and mixtures and copolymers thereof.

3. A heat-sensitive stencil sheet which comprises a thermoplastic film; an outermost liquid absorbing layer coated onto one side of said thermoplastic film; a porous substrate laminated to the other side of said thermoplastic film; and a layer reflecting visible or infrared rays laminated between said thermoplastic film and said porous substrate, wherein said liquid absorbing layer is made of a resinous compound, which resinous compound consists of a polymeric material having a high affinity for a liquid containing a photothermal conversion material deposited on said liquid absorbing layer.

4. A method for perforating a heat-sensitive stencil sheet comprised of a thermoplastic film, and a liquid absorbing layer coated onto one side of said thermoplastic film, and a layer reflecting visible or infrared rays laminated to the other side of said thermoplastic film, said method comprising ejecting intermittently or continuously in the form of dots or lines a photothermal conversion material contained in a liquid from a liquid-ejecting means to transfer it together with said liquid onto said liquid absorbing layer of said heat-sensitive stencil sheet; and then exposing said heat-sensitive stencil sheet to a visible or infrared ray to perforate completely through said heat-sensitive stencil sheet specifically at portions to which said photothermal conversion material has been transferred, wherein said ejecting is controlled by electric signals to produce a desired image.

5. A method for perforating a heat-sensitive stencil sheet comprised of a thermoplastic film, a layer reflecting visible or infrared rays formed on said thermoplastic film, and a liquid absorbing layer coated onto the layer reflecting visible or infrared rays, said method comprising ejecting intermittently or continuously in the form of dots or lines a photothermal conversion material contained in a liquid from a liquid-ejecting means to transfer it together with said liquid onto said liquid absorbing layer of said heat-sensitive stencil sheet; and then exposing said heat-sensitive stencil sheet to a visible or infrared ray to perforate completely through said heat-sensitive stencil sheet specifically at portions to which said photothermal conversion material has been transferred, wherein said ejecting is controlled by electric signals to produce a desired image.

6. A perforating method according to claim 4 or 5, wherein said liquid absorbing layer is made of a resinous compound, wherein said reflecting layer is a metal film vacuum-deposited on said thermoplastic film, and wherein said liquid absorbing layer and said reflecting layer are perforated together with said thermoplastic film during said exposing step.

7. A perforating method according to claim 4 or 5, wherein said liquid absorbing layer is made of a resinous compound, wherein said reflecting layer is made of a thermoplastic resin containing metal powders, and which said liquid absorbing layer and said reflecting layer are perforated together with said thermoplastic film during said exposing step.

8. A heat-sensitive stencil sheet which comprises a thermoplastic film, a layer reflecting visible or infrared rays formed on one side of said thermoplastic film; an outermost liquid absorbing layer coated onto said reflecting layer, and a porous substrate laminated to the other side of said thermoplastic film, said liquid absorbing layer being made of a resinous compound, which resinous compound consists of a polymeric material having a high affinity for a liquid containing a photothermal conversion material deposited on said liquid absorbing layer.

9. Heat-sensitive stencil sheet defined in claim 3 or 8, in which said reflecting layer is a metal film vacuum-deposited on said thermoplastic film.

10. Heat-sensitive stencil sheet defined in claim 3 or 8, in which said reflecting layer is made of a thermoplastic resin containing metal powders.

* * * * *